Oct. 23, 1956

W. G. MILLER 2,768,337

SOLENOID ARRANGEMENT

Filed Nov. 8, 1951

Inventor
WESLEY G. MILLER

By
Florian G. Miller
Attorney

United States Patent Office 2,768,337
Patented Oct. 23, 1956

2,768,337
SOLENOID ARRANGEMENT

Wesley G. Miller, Erie, Pa., assignor to Hays Manufacturing Company, Erie, Pa., a corporation of Pennsylvania Application November 8, 1951, Serial No. 255,466

3 Claims. (Cl. 317—158)

This invention relates generally to ferrules and more particularly to ferrules for use in firmly securing a member with a cylindrical bore to a cylindrical shaft.

Much difficulty has been heretofore experienced in firmly securing a solenoid member on a valve assembly to operate a valve therein inasmuch as there is considerable impact, shock, and vibration with a plunger moving longitudinally of the valve assembly and solenoid. Cylindrical ferrules made within close tolerances have been tried to firmly secure the solenoid member to the valve assembly but it was found that even though considerable time was taken to form the ferrules to extremely close tolerances, they would still permit the solenoid member to become loose on the valve assembly. These prior ferrules were costly in manufacture and difficult to assemble. Particular difficulty has been experienced in solenoid operated valves with A. C. hum which becomes very severe when the solenoid casing is loose.

It is, accordingly, an object of my invention to provide a ferrule for disposal between the inner bore of an outer member to be supported and the outer surface of a cylindrical member in said bore to support said outer member in a tight secure position which is simple in construction, economical in cost, easy to assemble, economical in manufacture, and efficient in operation.

Another object of my invention is to provide a tapered ferrule for easy disposal between two cylindrical surfaces to support an outer member with a cylindrical bore onto a cylindrical support without drawing the ferrule down to close tolerances.

Another object of my invention is to provide a ferrule for disposal between an inner cylindrical member and a cylindrical bore of a member to be supported on said inner cylindrical member which provides a spring action to maintain a tension between the two members to securely support the outer member on the inner member.

Other objects of my invention will become evident from the following detailed description, taken in conjunction with the accompanying drawings, in which.

Figure 1:
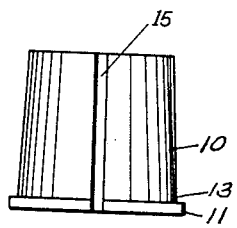
Fig. 1 is a side elevational view of my novel ferrule.
Figure 2:
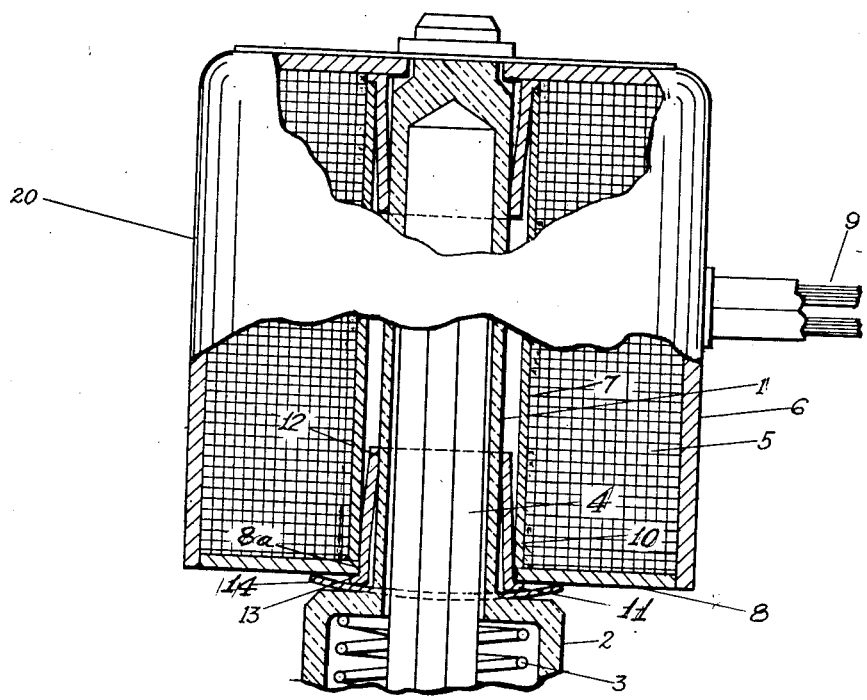
Fig. 2 is a fragmentary vertical sectional view showing my ferrule disposed between the inner surface of a bore of a solenoid member and a cylindrical member extending upwardly from a valve assembly.

Referring now to the drawings, I show in Figs. 1 and 2 a plunger sleeve 1 extending upwardly from a solenoid adapter bonnet 2 housing a spring 3 for urging a valve (not shown) on its seat in a valve housing of conventional construction. A conventional plunger 4 reciprocates in the plunger sleeve 1 upon energization of the coils 5 of a solenoid member 20. The coils 5 are disposed in an inverted cup shaped casing 6 surrounding an inner non-conducting sleeve 7 closed at the bottom by a bottom plate 8. The sleeve 7 surrounds and is spaced outwardly from the plunger sleeve 1. Electrical leads 9 extend outwardly from the coils 5 for connection to a source of electricity.

Now coming to the gist of my invention, tapered ferrules 10 with outwardly directed flanges 11 on the large diameter ends thereof are disposed in the ends of the annular space formed between the outer side of the plunger sleeve 1 and the inner side of the sleeve 7 in the solenoid member 20. The inner minor diameter of each ferrule 10 at 12 is slightly smaller (five to ten thousandths) than the outside diameter of the plunger sleeve 1 and the major outside diameter of each ferrule 10 at 13 is slightly greater (five to ten thousandths) than the inside diameter of the inner sleeve 7 of the solenoid member 20 and the diameter of the aperture 8a in the bottom plate 8. A conventional spring washer 14 is disposed between the top of the bonnet 2 and the bottom plate 8 of the solenoid member 20. Each ferrule 10 is tapered longitudinally thereof about one-half inch for a foot of included angle and it fits with an easy press fit into the space between the solenoid inner sleeve 7 and the plunger sleeve 1. The major outside diameter of the ferrule 10 is ordinarily five to ten thousandths of an inch greater than the inside diameter of the sleeve 7 and the aperture 8a in the bottom plate 8 and the minor inside diameter is five to ten thousands of an inch less than the outside diameter of the plunger sleeve 1. Thus, a comparatively light press fit permits the ferrules 10 to be disposed in place as shown in Fig. 2. The thickness of the ferrule is comparatively small in that a gauge 24 which is approximately .0239 inch is used so that the portions of the ferrules 10 engaging the plunger sleeve 1 and the sleeve 7 and the margin of the aperture 8a in the bottom plate 8 flatten out to provide a substantial engaging area to firmly support the solenoid member 20 on the plunger sleeve 1. It will be noted that there are two points of contact; namely, the normal minor inner diameter of the ferrule 10 is tightly engaged with the outside surface of the plunger sleeve 1, and the normal major outer diameter of the ferrule 10 contacts the inner surface of the sleeve and the margin of the aperture 8a in the bottom plate 8. It has been found that this type of ferrule may be made by conventional stamping operations in that close tolerances are not required as has been heretofore the case in the use of cylindrical ferrules. I preferably split the ferrule longitudinally at 15 so that the ferrule can be pressed with a minimum of effort and without distorting the ferrule 10.

In assembly, the ferrules 10 are pressed into the ends of the sleeve 7 of the solenoid member to be supported until the flange 11 thereof engages the end of the sleeve 7 or the end plate 8. In pressing the ferrules 10 home, the minor inner diameter of the ferrule engages the plunger sleeve 1 and flattens out a given amount and the outer major diameter of the ferrule 10 flattens out a given amount in engaging the margin of the aperture 8a of the bottom plate 8 and the sleeve 7.

My ferrule may be used in any installation for supporting an outer member with a cylindrical bore on an inner sleeve or cylinder. Close tolerances are not necessary, the ferrules are stamped out quickly and cheaply so that the cost is greatly reduced, vibration and A. C. hum are minimized, and there is counteraction between the different surfaces of the ferrule so as to make a tight fit.

Various changes may be made in the specific embodiment of my invention without departing from the spirit thereof or from the scope of the appended claims.

What I claim is:

1. In combination, an upwardly extending plunger sleeve on a valve assembly and an electrical solenoid member having an inner bore supported on said plunger sleeve, means to support the lower end of said solenoid member, a longitudinally tapered, longitudinally split ferrule terminating at the large end in an outwardly extending flange, said ferrule being disposed between said plunger sleeve and the inner surface of the inner bore of said solenoid member with said flange engaging the end of said solenoid member, the minor inner diameter of said ferrule being slightly smaller than the external diameter of said plunger sleeve.

2. The combination recited in claim 1 wherein said means to support the lower end of said solenoid member comprises a second ferrule disposed on said sleeve between the inner surface of the inner bore of said solenoid member.

3. A ferrule as set forth in claim 1 wherein the major outside diameter of said ferrule is slightly greater than the internal diameter of the bore of said solenoid member.

References Cited in the file of this patent

UNITED STATES PATENTS

| | | |
|---|---|---|
| 349,261 | Roots | Sept. 21, 1886 |
| 1,656,895 | Ackerman | Jan. 24, 1928 |
| 1,970,624 | Recker | Aug. 21, 1934 |
| 2,098,196 | Ray | Nov. 2, 1937 |

FOREIGN PATENTS

| | | |
|---|---|---|
| 470,745 | Germany | Jan. 30, 1929 |